(12) United States Patent
Burges et al.

(10) Patent No.: US 6,704,718 B2
(45) Date of Patent: Mar. 9, 2004

(54) SYSTEM AND METHOD FOR TRAINABLE NONLINEAR PREDICTION OF TRANSFORM COEFFICIENTS IN DATA COMPRESSION

(75) Inventors: Chris J. C. Burges, Bellevue, WA (US); Patrice Y. Simard, Bellevue, WA (US); Henrique S. Malvar, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 271 days.

(21) Appl. No.: 09/681,789

(22) Filed: Jun. 5, 2001

(65) Prior Publication Data

US 2002/0184272 A1 Dec. 5, 2002

(51) Int. Cl.[7] .............................. G06E 1/00; G06E 3/00; G06F 15/18; G06G 7/00
(52) U.S. Cl. .............................. 706/21; 706/15; 706/16
(58) Field of Search .............................. 706/21, 15, 16

(56) References Cited

U.S. PATENT DOCUMENTS 6,480,547 B1 * 11/2002 Chen et al. ............ 375/240.27

OTHER PUBLICATIONS

Henrique S. Malvar; Fast Progressive Wavelet Coding: 1999; IEEE; 336–343.*
Deever, A and S.s. Hemani. What's your sign?: efficient sign coding for embedded wavelet image coding. In Proc. IEEE Data Compression Conf., pp. 273–282, Apr. 2000.
Drucker, H., CJC Burges, L. Kaufman, A. Smola, and V. Vapnik. Support vector regression machines. Advances in Neural Information Processing systems, 9:155–161, 1997.
LeCun, Y., J.S. Denker, S. Solla, R.E. Howard, and L.D. Jackel. Optimal brain damage in D. touretzky, editor, Advances in Neural Information Processing Systems, pp. 509–605. Morgan Kaufman, 1990.
Liu, J. and P. Moulin. Analysis of interscale and intrascale dependencies between image wavelet coefficietns. In Proc. IEEE Int. Conf. on Image Processing, Vancouver Canada, Sep. 2000.
Malvar, H.S. "Fast Progressive Wavelet Coding", IEEE, pp. 336–343, 1999.
Said, A., et al., "A New, Fast, and Efficient Image Codec Based on Set Partitioning in Hierarchical Trees", IEEE Transactions on Circuits and Systems for Video Technology, 6(3), pp. 243–250, Jun. 1996.
Scott, M. Lo Presto and Kannan Ramchandran. Image coding based on mixture modeling of wavelet coefficients and a fast estimation–quantization framework. In Data Compression Conference, snowbird, Utah, 1997.
Shapiro, J., "Embedded image coding using zerotrees of wavelet coefficients," IEEE Trans. Signal Processing, vol. 41, pp. 3445–3462, Dec. 1993.

* cited by examiner

*Primary Examiner*—Ramesh Patel
*Assistant Examiner*—Joseph P. Hirl
(74) *Attorney, Agent, or Firm*—Lyon & Harr, L.L.P.; Craig S. Fischer

(57) ABSTRACT

A system and method for performing trainable nonlinear prediction of transform coefficients in data compression such that the number of bits required to represent the data is reduced. The nonlinear prediction data compression system includes a nonlinear predictor for generating predicted transform coefficients, a nonlinear prediction encoder that uses the predicted transform coefficients to encode original data, and a nonlinear prediction decoder that uses the predicted transform coefficients to decode the encoded bitstream and reconstruct the original data. The nonlinear predictor may be trained using training techniques, including a novel in-loop training technique of the present invention. The present invention also includes a method for using a nonlinear predictor to encode and decode data. The method also includes improving the performance of the nonlinear prediction data compression and decompression using several novel speedup techniques.

34 Claims, 12 Drawing Sheets

SYSTEM AND METHOD FOR TRAINABLE NONLINEAR PREDICTION OF TRANSFORM COEFFICIENTS IN DATA COMPRESSION

BACKGROUND OF INVENTION

1. Field of the Invention

The present invention relates in general to data compression and more particularly to a system and method for performing trainable nonlinear prediction of transform coefficients in data compression such that the number of bits required to represent the data at a given signal to noise ratio is decreased.

2. Related Art

Data compression is widely used and vital to the high-speed and efficient exchange and storage of data. One of the goals of data compression is to compress original data as much as possible, transmit or store the compressed data, and then uncompress the compressed data to reconstruct the original data. Moreover, this compression should be performed in such a way that the noise introduced into the data by the compression remains acceptable. Better compression means that, at a given signal to noise ratio, the compressed data are smaller and thus use fewer bits of information to represent the original data. Using fewer bits of information both reduces the time required to transmit the compressed data and the amount of storage space needed to store the compressed data. This can significantly shorten the download time of compressed data (such as from the Internet) and can save precious space on storage media (such as a hard disk). This results in a savings of both time and expense.

Some popular types of data compression techniques use transform coefficients. For example, wavelet-based data compression, which is commonly used in the compression of two-dimensional (2D) images, performs a linear, reversible transformation on the original image data to produce wavelet coefficients. Wavelets are a set of basis functions that capture image information in both time and frequency space. Wavelet-based data compression is generally preferred over other types of transform-coefficient compression because after transformation many wavelet coefficients are close to zero. After quantization to integer values (for transmission or storage) many of these wavelet coefficients become zero. The end result is good compression, because long sequences of zeros can be represented efficiently by, for example, run-length encoding.

In general, wavelet-based data compression is a three-step process involving data transformation, quantization and lossless encoding. More specifically, during the first step of the process the data is transformed. A wavelet transformation is performed using wavelet decomposition on the data to obtain wavelet coefficients. Wavelet decomposition is a linear, invertible mapping of the data from one space to another space. This mapping or transformation yields the wavelet coefficients.

The second step of wavelet-based data compression involves quantizing the wavelet coefficients by dividing by a floating point number called a quantization threshold Q and then taking the integer part of the result. This generates quantized values for the data. During this quantization step, the data is scaled and information may be discarded when the integer part is kept and the fractional part is ignored. For example, if the image being compressed includes detail that the human eye cannot perceive, then this information may be usefully discarded. After this quantization step, for suitable choices of Q, many quantized wavelet coefficients, which were not previously zero, map to zero. The amount of information lost in the quantization step, and therefore the quality of the reconstructed image, can be controlled by varying Q.

The third step of wavelet-based data compression involves using an entropy encoder to encode, without loss, the quantized wavelet coefficients resulting from the quantization procedure. In general, any suitable entropy encoding technique may be used. For example, common entropy encoding techniques in include Huffman, arithmetic and run-length encoding. Each of these encoding techniques is well known to those having ordinary skill in the art.

One problem, however, with current transform-coefficient compression (such as wavelet-based data compression) is that the linear transformation of the data results in less than optimal compression. This is because after the linear transformation there exist residual correlations among the transform coefficients. For example, these residual correlations occur in the transform coefficients corresponding to edges in an original image. The presence of these residual correlations in the transformed data indicates a redundancy in the representation of the original image. If this redundancy is removed, then this could result in improved compression.

Therefore, what is needed is a data compression system and method that improves the compression performance of existing transform coefficient data compression techniques by overcoming the limitations of the linear transformation. What is also needed is a data compression system and method that takes advantage of residual correlations to improve compression performance. Although several other known techniques (such as, for example, arithmetic encoding and zero tree techniques) attempt to take advantage of these residual correlations, what is further needed is a better and more efficient technique for achieving improved data compression.

SUMMARY OF INVENTION

To overcome the limitations in the prior art as described above and other limitations that will become apparent upon reading and understanding the present specification, the present invention includes a system and method for using nonlinear predictors to predict transform coefficients during data compression. Using nonlinear predictors reduces the number of bits required to represent the data being compressed (at a given signal to noise ratio) and therefore improves compression. The present invention overcomes the limitations of linear transformations used in data compression by utilizing, in a new way, the nonlinear dependencies remaining after the linear transformation.

Existing transform coefficients compression techniques perform a linear transformation on the data. After this linear transformation, however, nonlinear dependencies between transform coefficients still remain. The present invention models these nonlinear dependencies by generating a nonlinear function describing the dependencies. Using this nonlinear function, a prediction of the transform coefficients can be made and these predicted transform coefficients can be compared to the original transform coefficients. The predicted transform coefficients are then subtracted from the original transform coefficients to obtain residual coefficients.

Better and more accurate predictions of the transform coefficients allow the variance of the transform coefficients to be reduced. Since the mean of the residuals is zero, reducing the variance of the transform coefficients increases the probability that more transform coefficients will quantize to zero. This in turn increases the lengths of the runs of zeros that are presented to the entropy encoder. Increasing the length of the runs of zeros to be encoded achieves better compression because long strings of zeros can be encoded efficiently.

In general, the nonlinear prediction data compression system of the present invention includes a nonlinear prediction encoder for compressing data and a nonlinear prediction decoder for decompressing the data. The nonlinear prediction encoder of the present invention includes a prediction module that generates predicted transform coefficients. The prediction module includes a trainable nonlinear predictor for generating predicted transform coefficients, a store for storing data used by the predictor in the prediction, and an inverse quantizer for providing unquantized residuals to the prediction module. The trainable nonlinear predictor may include a neural network.

The present invention also includes a method for compressing data using a nonlinear predictor. The method includes a novel training technique that is used to train the nonlinear predictor. This training technique includes an in-loop training technique whereby the nonlinear predictor is trained in a loop to reduce oscillations that may cause erroneous predictions. The present invention also includes novel speedup techniques that improve the speed at which the data is compressed and decompressed. These speedup techniques include two context test techniques that determine whether to apply the nonlinear predictor based on reconstructed coefficient values used by the predictor as inputs. Another speedup technique of the present invention is a sparse forward propagation technique that takes advantage of the sparseness of the input data to the predictor.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not by the preceding summary or the following detailed description.

BRIEF DESCRIPTION OF DRAWINGS

The present invention can be further understood by reference to the following description and attached drawings that illustrate the preferred embodiments. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION

Figure 1:
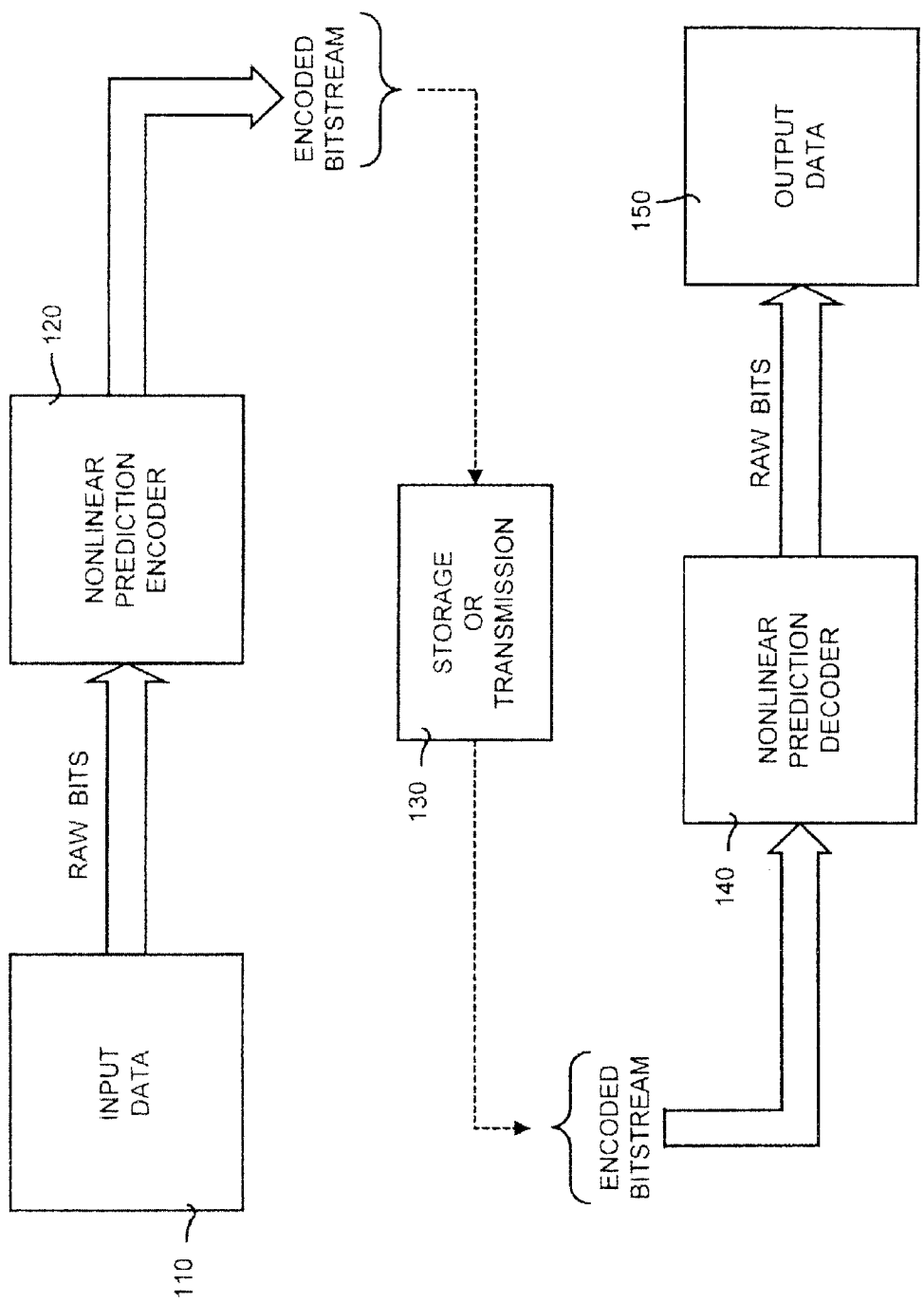
FIG. 1 is an overall block/flow diagram illustrating an exemplary embodiment of the nonlinear prediction data compression system and method of the present invention for encoding/decoding data and is shown for illustrative purposes only.

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction

Current transform coefficient data compression uses linear decomposition when compressing data. Because this decomposition is linear, nonlinear dependencies or residual correlations between transform coefficients remain after decomposition. Several current techniques take advantage of these residual correlations to improve compression performance. These techniques include, for example, arithmetic coding, zero tree reordering, zig-zag reordering and ping-pong reordering techniques. The present invention provides a novel system and method for taking advantage of residual correlations to improve data compression by using trainable nonlinear predictors to predict transform coefficients. These nonlinear predictors exploit the nonlinear dependencies between transform coefficients that remain after decomposition. In addition, the present invention includes a novel in-loop training technique that may be used to train the nonlinear predictor.

The present invention models the nonlinear dependencies between transform coefficients by using a trainable nonlinear predictor to learn a nonlinear function that represents the nonlinear dependencies. The technique for learning the nonlinear function may be any of the commonly known techniques used to solve a regression problem. By way of example, one such technique is discussed by H. Drucker, C. J. C. Burges, L. Kaufman, A. Smola and V. Vapnik in a paper entitled "Support vector regression machines" in *Advances in Neural information Processing Systems,* 9:155–161, 1997 and other techniques are discussed by P. J. Green and B. W. Silverman in Nonparametric Regression and Generalized Linear Models, Chapman and Hall, 1994. These techniques generally find a function that best fits the given data. Thus, given a set of transform coefficients, the present invention uses the trainable nonlinear predictor (such as a neural network) to learn the nonlinear function that best represents these transform coefficients.

After training of the nonlinear predictor, the nonlinear function is learned. Next, the trained nonlinear predictor begins predicting transform coefficients. These predicted transform coefficients are then subtracted from original transform coefficients to obtain residual coefficients. By making good predictions of the transform coefficients, the present invention reduces the variance of the transform coefficients. Since the mean is zero, reducing the variance implies that more transform coefficients are likely to quantize to zero. This increases the lengths of the runs of zeros that are presented to the entropy encoder, thereby improving compression performance. By increasing the accuracy of the prediction, the variance of the transform coefficients is reduced and fewer bits are required to represent the data being compressed. Exploiting the nonlinear dependencies that exist between transform coefficients results in more accurate predictions of the transform coefficients and thus better compression.

II. General Overview

The present invention includes a nonlinear prediction data compression system and method for using a nonlinear predictor to predict transform coefficients. The present invention takes advantage of the nonlinear dependencies or residual correlations that remain after a linear decomposition. Using these nonlinear dependencies, accurate predictions of transform coefficients are obtained. Because the nonlinear dependencies of the transform coefficients are taken into account the resulting prediction of the transform coefficients are more accurate. In order to generate these predictions, any regression technique may be used that will learn the nonlinear function representing the nonlinear dependencies between the transform coefficients. The present invention uses a trainable nonlinear predictor (such as a neural network) to learn the nonlinear function. Because the variance of the residuals is thereby reduced, fewer bits are required to represent the data being compressed. Thus, the nonlinear prediction data compression system and method of the present invention provide a significant improvement in data compression.

FIG. 1 is an overall block/flow diagram illustrating an exemplary embodiment of the nonlinear prediction data compression system and method of the present invention for encoding/decoding data and is shown for illustrative purposes only. In general, the nonlinear prediction data compression system 100 operates by sending the raw bits of input data 110 to a nonlinear prediction encoder 120. In accordance with the present invention, the nonlinear prediction encoder 120 compresses the raw bits of the input data 110 and outputs an encoded bitstream. The encoded bitstream may be utilized, stored or transmitted (box 130). When it is desired to decode the encoded bitstream, the bitstream is sent to a nonlinear prediction decoder 140. In accordance with the present invention, the encoded bitstream is processed by the nonlinear prediction decoder 140 to reconstruct the original data. Using raw bits, output data 150 is produced that substantially matches the input data 110.

Figure 2:
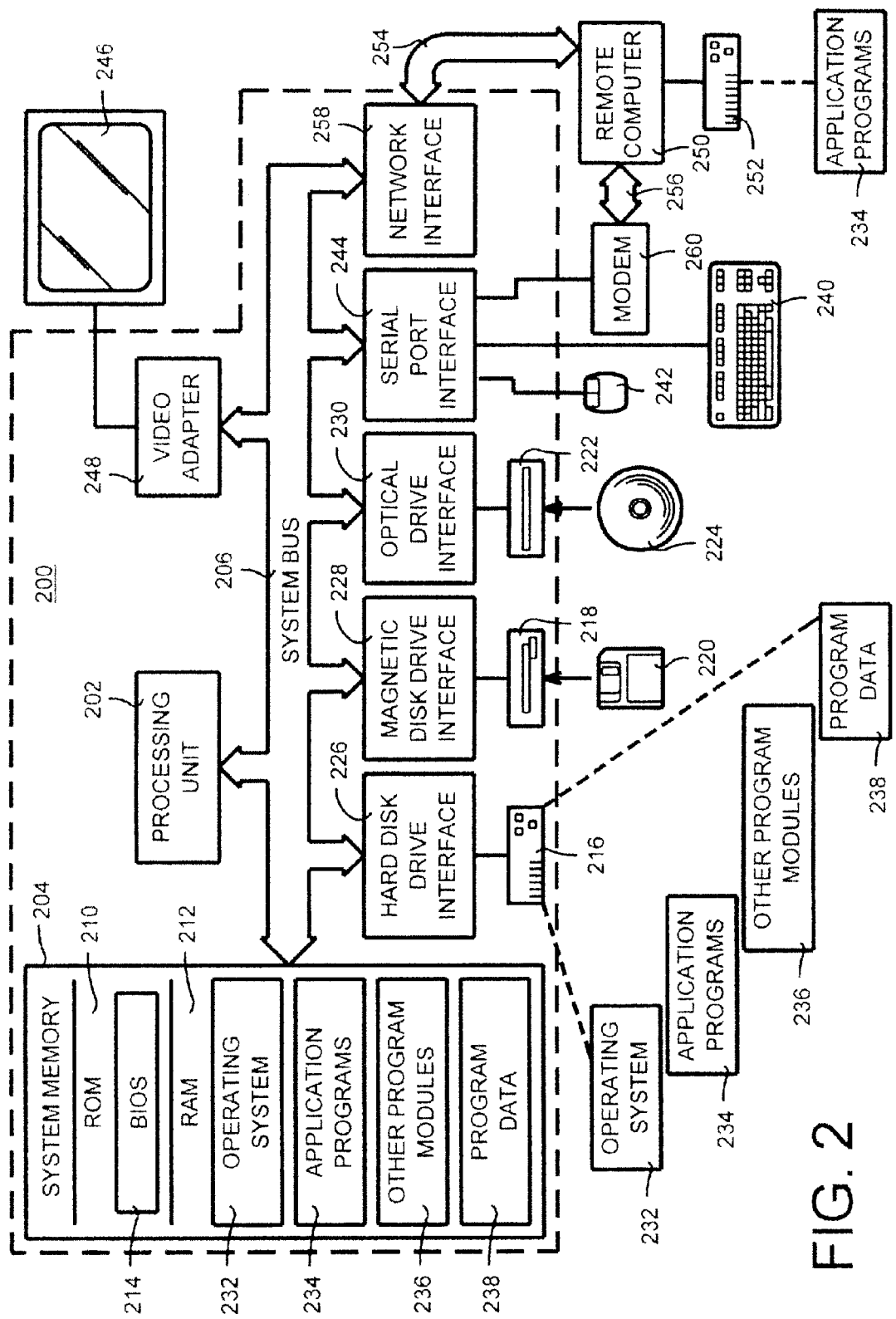
FIG. 2 is a general block diagram illustrating a computing apparatus that may be used to carry out the present invention.

FIG. 2 is a general block diagram illustrating a computing apparatus that may be used to carry out the present invention. FIG. 2 and the following discussion are intended to provide a brief, general description of a suitable computing environment in which the nonlinear prediction data compression system and method of the present invention may be implemented. Although not required, the present invention will be described in the general context of computer-executable instructions (such as program modules) being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

Referring to FIG. 2, an exemplary system for implementing the present invention includes a general-purpose computing device in the form of a conventional personal computer 200, including a processing unit 202, a system memory 204, and a system bus 206 that couples various system components including the system memory 204 to the processing unit 202. The system bus 206 may be any of several types of bus structures including a memory bus or memory controller, a peripheral bus, and a local bus using any of a variety of bus architectures. The system memory includes read only memory (ROM) 210 and random access memory (RAM) 212. A basic input/output system (BIOS) 214, containing the basic routines that help to transfer information between elements within the personal computer 200, such as during start-up, is stored in ROM 210. The personal computer 200 further includes a hard disk drive 216 for reading from and writing to a hard disk (not shown), a magnetic disk drive 218 for reading from or writing to a removable magnetic disk 220, and an optical disk drive 222 for reading from or writing to a removable optical disk 224 (such as a CD-ROM or other optical media). The hard disk drive 216, magnetic disk drive 228 and optical disk drive 222 are connected to the system bus 206 by a hard disk drive interface 226, a magnetic disk drive interface 228 and an optical disk drive interface 230, respectively. The drives and their associated computer-readable media provide nonvolatile storage of computer readable instructions, data structures, program modules and other data for the personal computer 200.

Although the exemplary environment described herein employs a hard disk, a removable magnetic disk 220 and a removable optical disk 224, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk, magnetic disk 220, optical disk 224, ROM 210 or RAM 212, including an operating system 232, one or more application programs 234, other program modules 236 and program data 238. A user (not shown) may enter commands and information into the personal computer 200 through input devices such as a keyboard 240 and a pointing device 242. In addition, other input devices (not shown) may be connected to the personal computer 200 including, for example, a camera, a microphone, a joystick, a game pad, a satellite dish, a scanner, and the like. These other input devices are often connected to the processing unit 202 through a serial port interface 244 that is coupled to the system bus 206, but may be connected by other interfaces, such as a parallel port, a game port or a universal serial bus (USB). A monitor 246 or other type of display device is also connected to the system bus 206 via an interface, such as a video adapter 248. In addition to the monitor 246, personal computers typically include other peripheral output devices (not shown), such as speakers and printers.

The personal computer 200 may operate in a networked environment using logical connections to one or more remote computers, such as a remote computer 250. The remote computer 250 may be another personal computer, a server, a router, a network PC, a peer device or other common network node, and typically includes many or all of the elements described above relative to the personal computer 200, although only a memory storage device 252 has been illustrated in FIG. 2. The logical connections depicted in FIG. 2 include a local area network (LAN) 254 and a wide area network (WAN) 256. Such networking environments are commonplace in offices, enterprise-wide computer networks, intranets and the Internet.

When used in a LAN networking environment, the personal computer 200 is connected to the local network 254 through a network interface or adapter 258. When used in a WAN networking environment, the personal computer 200 typically includes a modem 260 or other means for establishing communications over the wide area network 256, such as the Internet. The modem 260, which may be internal or external, is connected to the system bus 206 via the serial port interface 244. In a networked environment, program modules depicted relative to the personal computer 200, or portions thereof, may be stored in the remote memory storage device 252. It will be appreciated that the network connections shown are exemplary and other means of establishing a communications link between the computers may be used.

III. Components of the Invention

Figure 3:
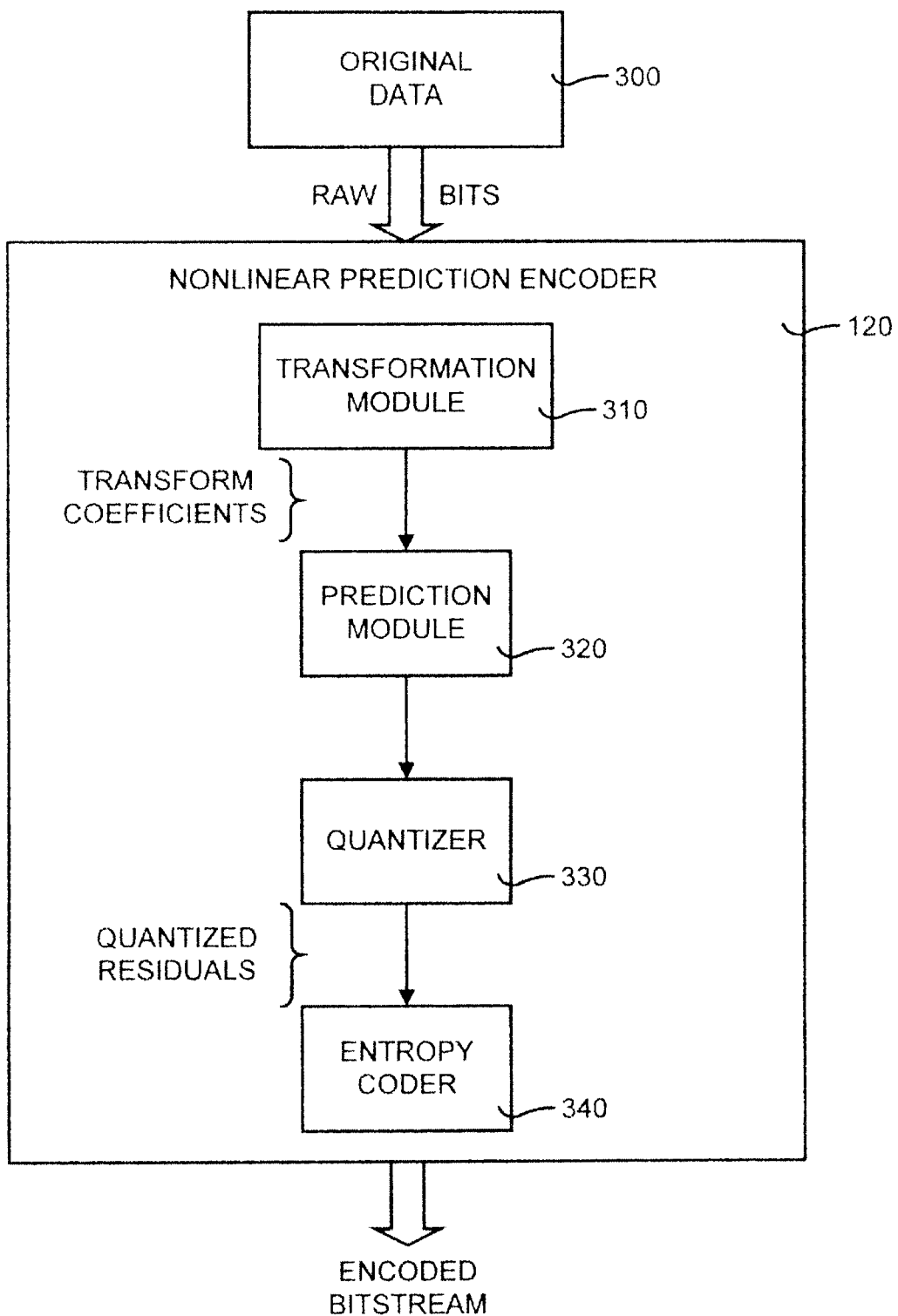
FIG. 3 is a general block diagram illustrating the components of the nonlinear prediction encoder of the present invention.

The nonlinear prediction data compression system and method of the present invention includes a nonlinear prediction encoder for compressing data and a nonlinear prediction decoder for decompressing data. FIG. 3 is a general block diagram illustrating the components of the nonlinear prediction encoder 120 of the present invention. Data in the form of raw bits (box 300) is sent to the nonlinear prediction encoder 120 for compressing the original data. The nonlinear prediction encoder 120 includes a transformation module 310 for performing a linear decomposition of the data. Transform coefficients are sent from the transformation module 310 to a prediction module 320. As explained in detail below, this novel prediction module 320 uses a nonlinear predictor to predict transform coefficients. The original transform coefficients are subtracted from the predicted transform coefficients to obtain residuals.

The residuals are sent from the prediction module 320 to a quantizer 330. The quantizer 330 quantizes the residuals by dividing the residuals by a floating point number called a quantization threshold. The resulting quantized residuals are sent from the quantizer 330 to an entropy coder 340 for encoding by a lossless compression technique. The nonlinear prediction encoder 120 outputs an encoded bitstream for utilization, storage or transmission.

Figure 4:
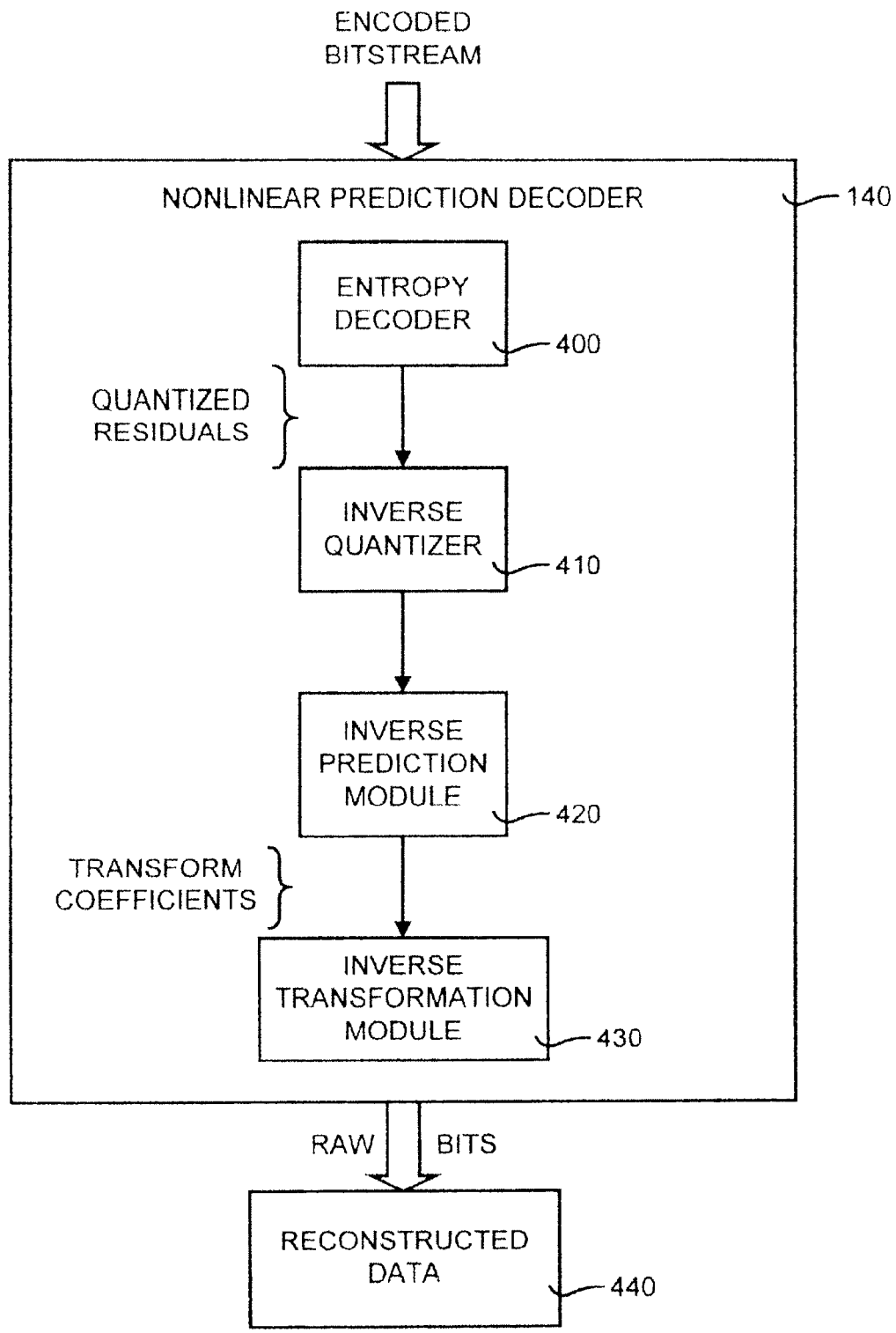
FIG. 4 is a general block diagram illustrating the components of the nonlinear prediction decoder of the present invention.

FIG. 4 is a general block diagram illustrating the components of the nonlinear prediction decoder of the present invention. An encoded bitstream (such as the encoded bitstream discussed above) is sent to the nonlinear prediction decoder 140 for processing. The nonlinear prediction decoder 140 includes an entropy decoder 400 for decompressing the encoded bitstream and recovering quantized residuals. Next, an inverse quantizer 410 is used to reverse the quantization process and reconstruct the residuals. The unquantized residuals are sent to a novel inverse prediction module 420 of the present invention. As discussed in detail below, the inverse prediction module 420 uses a nonlinear predictor to recover transform coefficients from the unquantized residuals. These transform coefficients are sent to an inverse transformation module 430 that reverse the linear decomposition and outputs raw bits. These raw bits are used to reconstruct the data (box 440) that substantially corresponds to the original data (box 300).

IV. Operational Overview of the Invention

Figure 5:
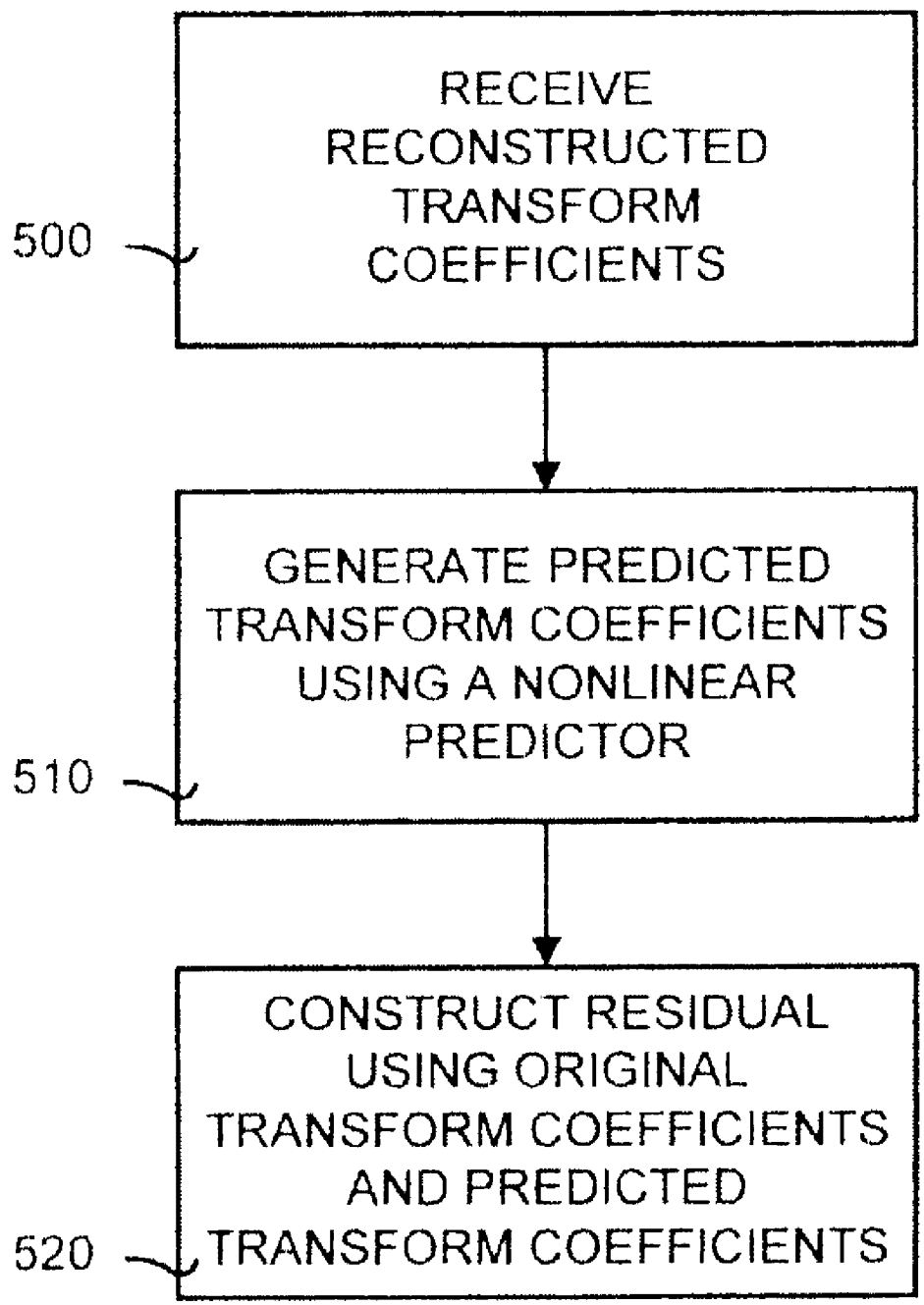
FIG. 5 is a general flow diagram illustrating the general operation of the prediction module shown in FIG. 3.

The nonlinear prediction data compression system and method of the present invention includes a prediction module 320 for predicting transform coefficients and an inverse prediction module 420 for recovering transform coefficients. FIG. 5 is a general flow diagram illustrating the general operation of the prediction module shown in FIG. 3. In general, the prediction module 320 uses a trainable nonlinear predictor to predict transform coefficients. As shown in FIG. 5, the prediction module 320 first receives reconstructed transform coefficients (box 500) and then generates predicted transform coefficients using a nonlinear predictor (box 510). Next, residuals are constructed by subtracting the predicted transform coefficients from the original transform coefficients (box 520).

Figure 6:
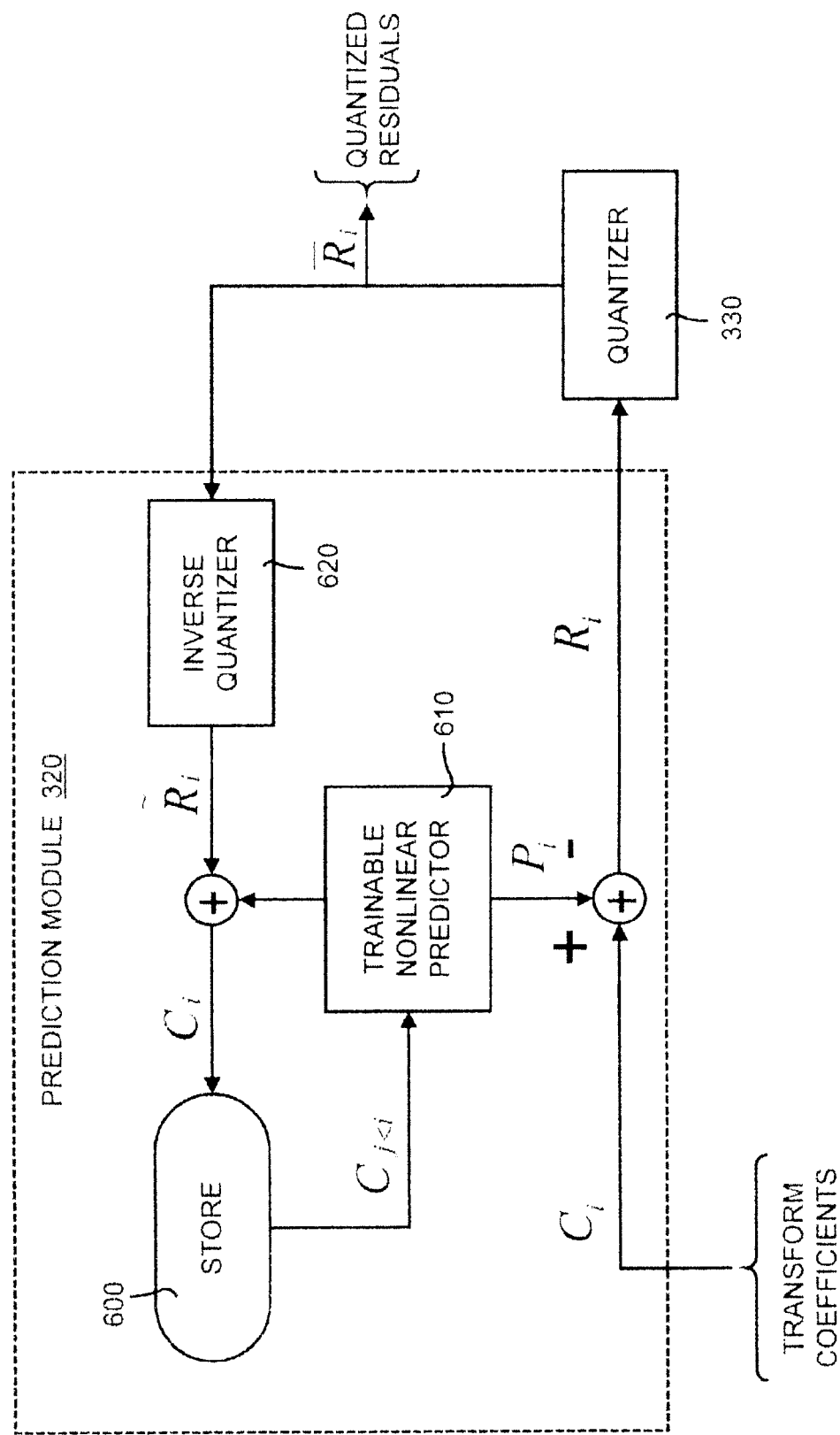
FIG. 6 is a detailed block/flow diagram illustrating the prediction module of the nonlinear prediction encoder shown in FIG. 3.

FIG. 6 is a detailed block/flow diagram illustrating the prediction module 320 of the nonlinear prediction encoder 120 shown in FIG. 3. As shown in FIG. 6, the prediction module 320 includes a store 600 containing a set of previously reconstructed transform coefficients, a trainable nonlinear predictor 610 for generating predicted transform coefficients and an inverse quantizer for providing unquantized residuals. The prediction module 320 receives as input the original transform coefficients. The trainable nonlinear predictor generates predicted transform coefficients $P_i$. The predicted coefficients $P_i$ are subtracted from the original coefficients $C_i$ to produce residuals $R_i$.

The residuals $R_i$ are received by the quantizer 330, which outputs quantized residuals $\overline{R}_i$. These quantized residuals $\overline{R}_i$ are sent as output to the entropy coder 340 and sent to the inverse quantizer 620. The inverse quantizer 620 processes the quantized residuals $\overline{R}_i$ and outputs unquantized residuals $\tilde{R}_i$. The trainable nonlinear predictor 610 outputs predicted transform coefficients $P_i$ and they are added to the unquantized residuals $\tilde{R}_i$ to produce reconstructed transform coefficients $\tilde{C}_i$, which are stored in the store 600. When a next set of transform coefficients is processed by the prediction module 320, the store 600 contains a previous set of reconstructed transform coefficients $\tilde{C}_{j<i}$. The subscript j<i indicates that the store 600 contains previously computed reconstructed coefficients. This set of previously computed reconstructed transform coefficients are used as inputs to the trainable nonlinear predictor 610 and are used to generate future predicted transform coefficients.

Figure 7:
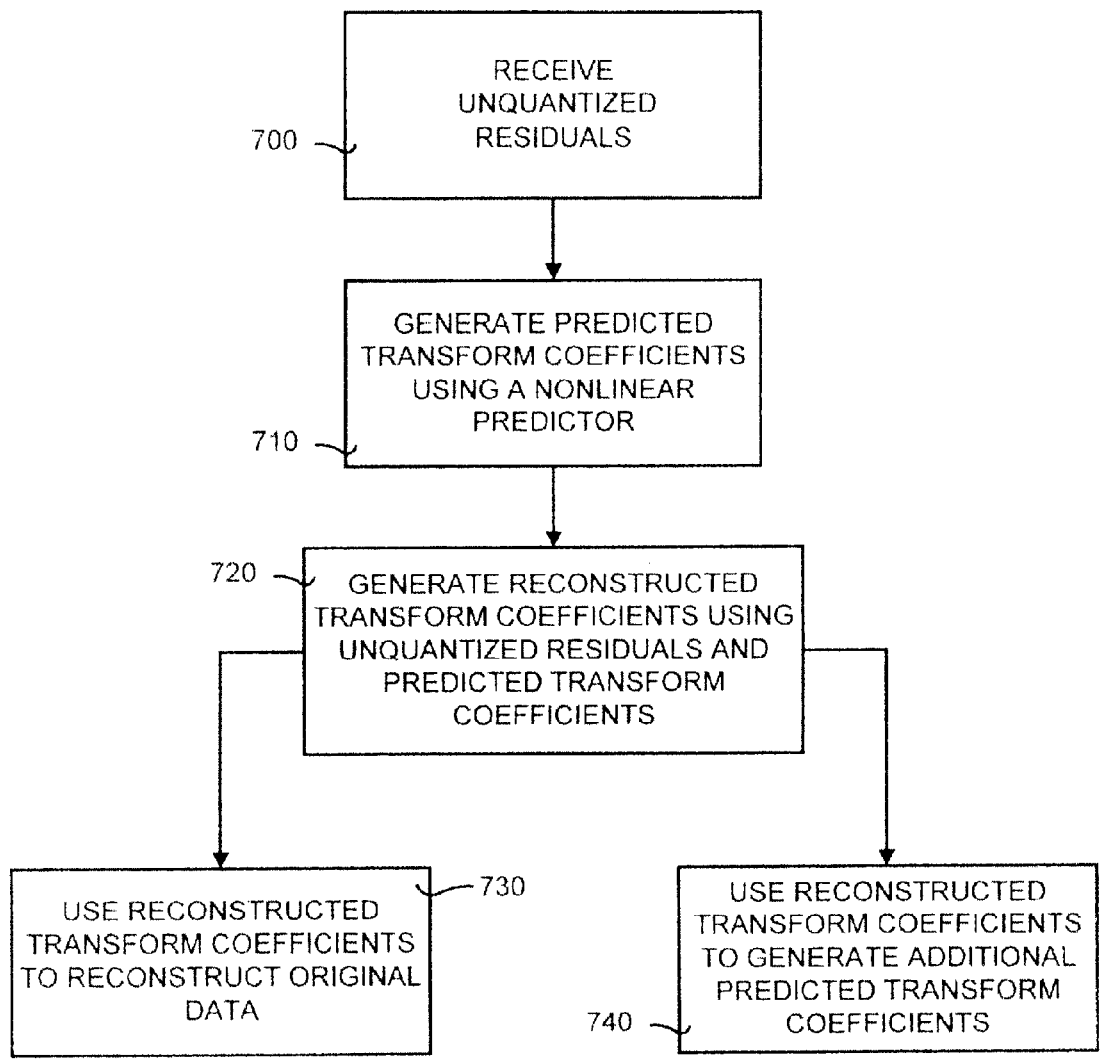
FIG. 7 is a general flow diagram illustrating the general operation of the inverse prediction module shown in FIG. 4.

FIG. 7 is a general flow diagram illustrating the general operation of the inverse prediction module shown in FIG. 4. In general, the inverse prediction module 420 recovers transform coefficients that are used to reconstruct the original data. As shown in FIG. 7, the inverse prediction module 420 receives unquantized residuals (box 700) and then generates predicted transform coefficients using a nonlinear predictor (box 710). Next, reconstructed transform coefficients are generated using the unquantized residuals and the predicted transform coefficients (box 720). Reconstruction of the transform coefficients is achieved by adding the predicted transform coefficients to the unquantized residuals. The reconstructed transform coefficients are used to reconstruct the original data (box 730) and are used by the nonlinear predictor to generate additional predicted transform coefficients (box 740).

It should be noted that the nonlinear predictor 610 of the prediction module 320 and the nonlinear predictor 810 of the inverse prediction module 420 have the same inputs and perform the same operations in both encoding and decoding stages.

Figure 8:
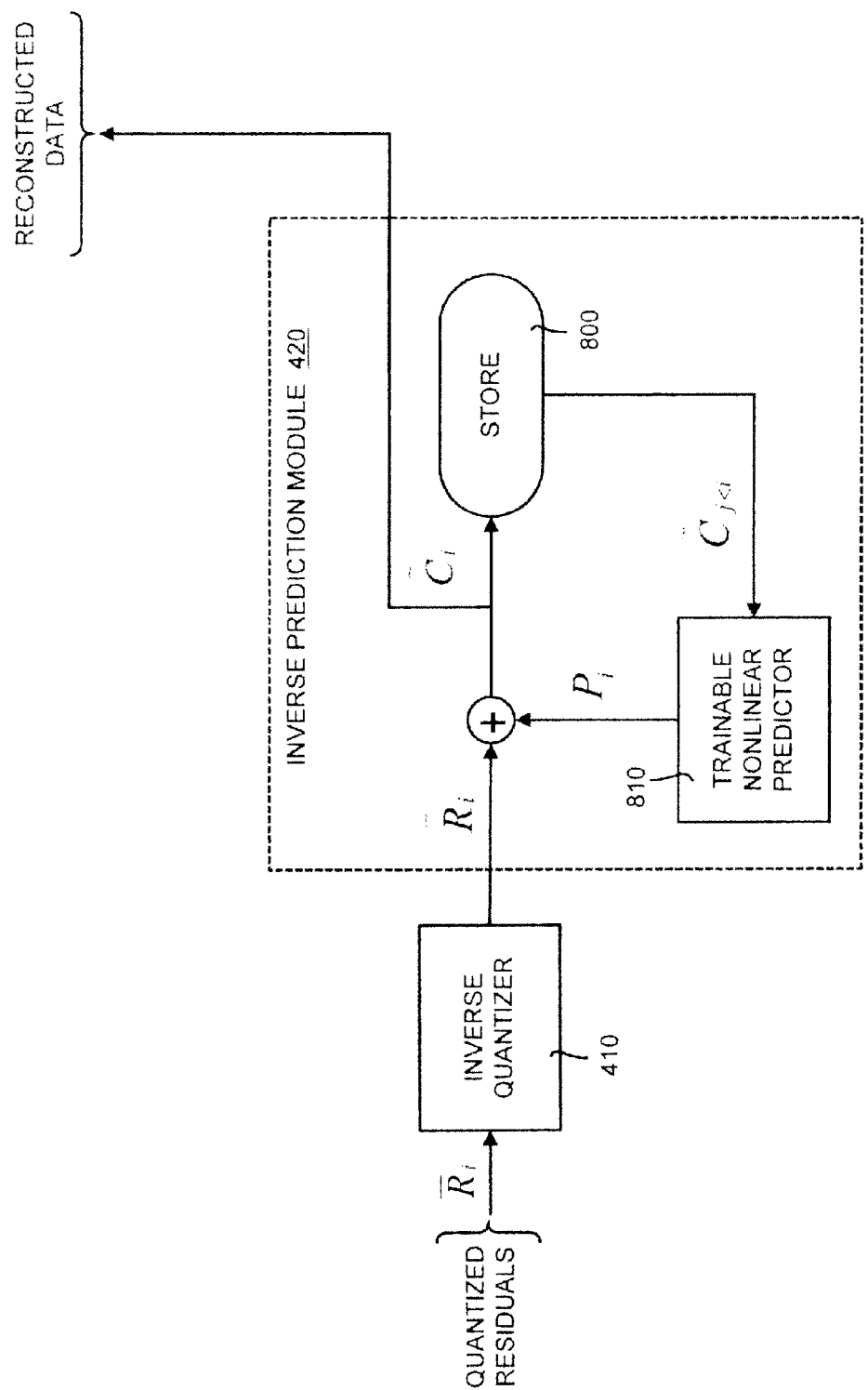
FIG. 8 is a detailed block/flow diagram illustrating the inverse prediction module of the nonlinear prediction decoder shown in FIG. 4.

FIG. 8 is a detailed block/flow diagram illustrating the inverse prediction module of the nonlinear prediction decoder shown in FIG. 4. As shown in FIG. 8, the inverse prediction module 420 includes a store 600 containing a set of previously reconstructed transform coefficients and a trainable nonlinear predictor 810 for generating predicted transform coefficients. As mentioned above, the predictor 810 performs the same operations as the prediction module nonlinear predictor 610.

The inverse prediction module 420 receives as input the unquantized residuals $\tilde{R}_i$. These unquantized residuals $\tilde{R}_i$ are obtained by processing quantized residuals $\overline{R}_i$ with the inverse quantizer 410. The trainable nonlinear predictor 810 outputs predicted transform coefficients and they are added to the unquantized residuals to produce reconstructed transform coefficients. The reconstructed transform coefficients $\tilde{C}_i$ are sent as output from the inverse prediction module 420 to the inverse transformation module 430 and then used to reconstruct the original data. In addition, the reconstructed transform coefficients $\tilde{C}_i$ are sent to the store 800 for use by the trainable nonlinear predictor 810. When a next set of unquantized residuals is processed by the inverse prediction module 420, the store 800 contains a previous set of reconstructed transform coefficients $\tilde{C}_{j<i}$. The subscript j<i indicates that the store 600 contains previously computed reconstructed coefficients. This set of previously computed reconstructed transform coefficients $\tilde{C}_{j<i}$ are used as inputs to the trainable nonlinear predictor 810.

V. Operational Details and Working Example

The following discussion presents a working example of an implementation of the nonlinear prediction data compression system and method discussed above. This working example is provided for illustrative purposes and is only one of several ways in which the present invention may be implemented.

Trainable Nonlinear Predictor

A number of different nonlinear predictors may be used to generate predicted transform coefficients. In general, the nonlinear predictor is solving a noisy regression problem to determine a nonlinear function that represents the nonlinear dependencies between the transform coefficients. As discussed above, this regression problem may be solved using techniques such as a support vector machine, a generalized linear model and a neural network. In this working example, a neural network is used as the nonlinear predictor.

Consider a neural network having two layers with a single output F(•) and parameterized by the vector of weights W. The output unit is a sigmoid taking values in [0, 1]. The neural network is trained for each subband and each wavelet level, and the outputs are translated and rescaled for each subband and wavelet level. Similarly, the inputs are rescaled so that most lie in the interval [−1, 1]. Since the goal is to train the neural network to minimize the variance of the prediction residuals $R_i = C_i - F(C_{j<i}, W)$ the following mean-squared error measure can be used:

$$E(W) \equiv \sum_i R_i^2 = \sum_i (C_i - F(C_{j<i}, W))^2 \qquad (1)$$

where $R_i$ is the residuals described above, $C_i$ is the original transform coefficients described above, and F(•) is the single output of the neural network. The single input is the previous set of reconstructed transform coefficients, $\tilde{C}_{j<i}$, which are parameterized by the vector of weights, W.

Training the Neural Network

One key aspect of a neural network is that it has the ability to learn. In theory, the more data the neural network sees the better it is able to determine the nonlinear function representing the nonlinear dependencies between transform coefficients. The present invention includes a novel in-loop training technique for training the neural network. This in-loop training technique is described in detail below. In addition, other training techniques may be used to train the neural network. These training techniques include offline training, which trains the neural network using static data, and online training, which trains the neural network using reconstructed transform coefficients from the data the is currently being processed. The offline and online training techniques are well known to those having ordinary skill in the art, and will not be discussed further.

Each of the training techniques uses training data to train the network. The neural network must be trained so that accurate predictions of the transform coefficients can be made. Because the neural network uses the reconstructed transform coefficients as inputs the network can be trained with the original transform coefficient data using equation (1), even though the neural network will operate on reconstructed data. The advantage of doing this is that training does not depend on the quantization threshold Q.

In general, the neural network in this working example was trained on a fixed set of data. The fixed network weights were made a part of the nonlinear prediction codec. Inputs to the neural network were computed from both the transform coefficients and the current predicted transform coefficients that are the previous outputs of the neural network. In particular, the neural network of the present invention is supplied with context that are causal. These causal contexts mean that the context has already been processed during previous processing. In this working example, the causal contexts are a previous set of reconstructed transform coefficients, $\tilde{C}_{j<i}$. As shown in FIG. 6, this previous set of reconstructed transform coefficients is contained in the store 600. The neural network is given the previous set of reconstructed transform coefficients as input and aims to predict the next transform coefficient. In order to achieve this, the neural network needs to be trained with a suitable amount of transform coefficient data.

The neural network may be trained using several prior art techniques. For example, a stochastic gradient descent approach may be used whereby one pattern at a time is presented to the network. In this approach, which is well known by those having ordinary skill in the art, the error $E_i(W)$ given by:

$$E_i(W) = (C_i - F(\tilde{C}_{j<i}, W))^2 \qquad (2)$$

and the overall error is reduced by updating the weights according to $$W^{t+1} = W^i - \varepsilon \frac{\partial E_i(W)}{\partial W} \quad (3)$$

where $\varepsilon$ is the learning rate. Equation (2) is computed using the whole training set, and the weights are accordingly updated.

In-Loop Training

In-loop training, similar to off-line training, uses a static set of images for training. However, with in-loop training the network is trained "in place" in the codec, with the network inputs generated using the network's previous outputs. In-loop training is used to reduce oscillations in test phase that reduce the signal to noise ratio of the reconstructed images. These oscillations arise from the positive feedback loop that is intrinsic to the nonlinear prediction architecture, as explained below. The oscillation problem is most noticeable when prediction is applied to higher wavelet levels (lower resolution). Because the neural network outputs are used to construct inputs for subsequent application of the same neural network, feedback can occur. This can lead to spurious responses, much like limit-cycles in quantized digital filters.

Figure 9:
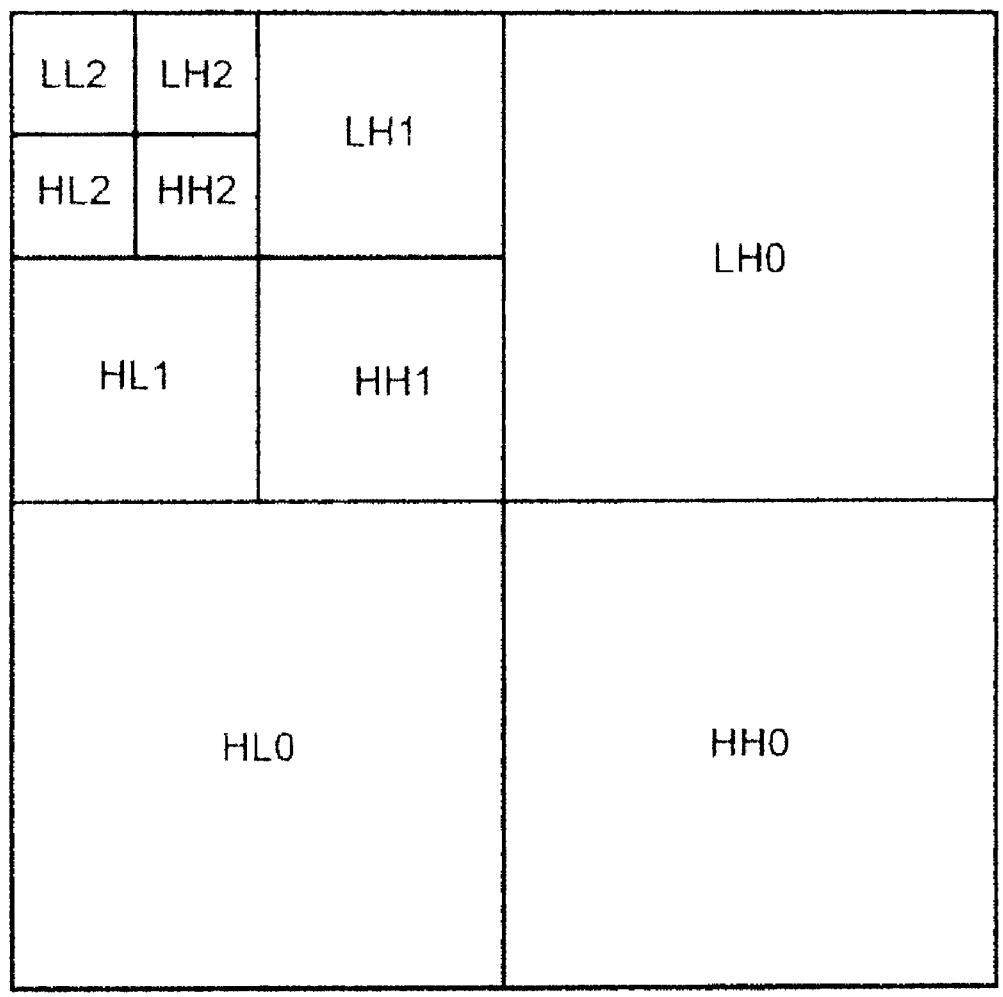
FIG. 9 illustrates a typical wavelet subband decomposition used in the working example.

Before illustrating this oscillation problem, subband decomposition will be discussed. FIG. 9 illustrates a typical wavelet subband decomposition. The notation L and H represent respectively lowpass and highpass filtering, where the first letter denotes vertical and the second letter denotes horizontal directions. The LL coefficients themselves work as smooth predictors (lowpass filters) and the LH, HL and HH coefficients are the residuals computed from these predictors. However, because the wavelet decomposition is linear, nonlinear dependencies among wavelet coefficients remain. The present invention exploits these nonlinear dependencies to improve prediction.

In order to illustrate this oscillation problem, a neural network trained for an LH2 subband was used, and the quantization threshold was set high enough that all wavelet coefficients quantize to zero. Thus, the reconstructed transform coefficients are due purely to the neural network outputs, and since the neural network sees its own outputs cumulatively, significant spurious predictions can occur.

Figure 10A:
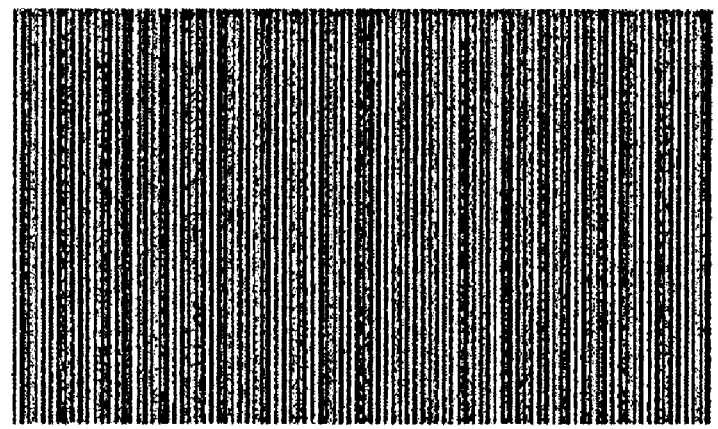
FIG. 10A illustrates the spurious output patterns generated for a trained neural network of the working example.
Figure 10B:
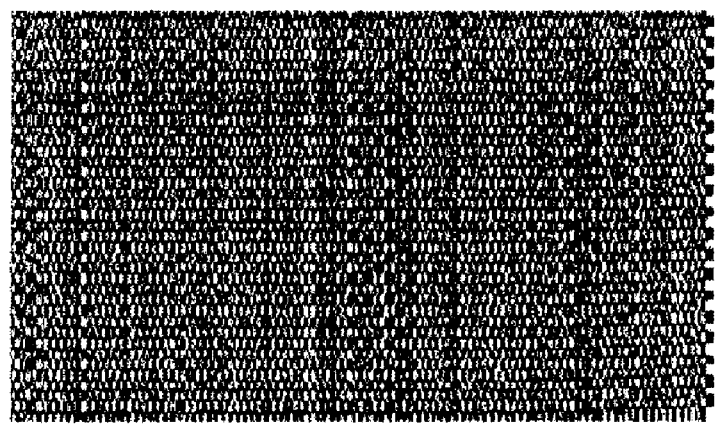
FIG. 10B illustrates a neural network of the working example that has random coefficients.

FIG. 10A illustrates the spurious output patterns generated for a trained neural network. FIG. 10B illustrates the effect of using the same neural network, but with random weights. Both FIGS. 10A and 10B show the reconstructed image, where the original image was mid-level gray. In FIGS. 10A and 10B, the effect has been amplified visually by scaling values so that all data that lies within two standard deviations of the mean maps to the dynamic gray level range. The bands are purely a consequence of feedback.

Some reconstructed images show similar but much less noticeable distortions. This effect introduces noise in the process and will impact the rate distortion curve detrimentally. In order to determine whether an arbitrary net (e.g. one not trained on the transform coefficient data) would give a similar effect, a network having random weights was used for prediction again of the LH2 subband only. For weights in [-0.1, 0, 1] a similar reconstructed image was observed (after again mapping gray levels to the dynamic range). However, for weights in [-1, 1] the pattern shown in FIG. 10B was observed.

The solution to this oscillation problem involves adjusting the training of the network so that such effects are penalized. This was accomplished by using in-loop training. Instead of training on static data, the causal contexts of reconstructed wavelet coefficients are computed on the fly and used as inputs to the neural network as it trains. In this way, any feedback is included in the training itself, so that feedback contributes to the mean squared error seen by the neural network, and thus is penalized.

The novel in-loop training technique of the present invention solved the oscillation problem for the high quantization level experiment described above. In this case the error produced by the feedback loop (i.e. the standard deviation of the reconstructed coefficients) was reduced by a factor of over 100 and the mean value was reduced from 8.4 to −0.1. In addition, no visible artifacts occurred in the reconstructed images.

This in-loop training technique has several implications. First, normally when training a network on static data shuffling the data first results in speedier convergence to the solution. However, using the in-loop training technique the training data itself is now dynamic such that shuffling the data is no longer desired. Second, a quantization level used during the training process must be selected. In this working example, a value of Q=10 was selected so that the resulting distortion is small. Finally, since the input data now changes with time, instead of stopping training after a fixed number of iterations, the training was stopped after 100 iterations have occurred during which no further reduction of the mean squared error on the validation image was achieved. The saved neural network is that for which the validation error is minimized.

Context and Network Architecture

This working example and encoder/decoder architecture is a modification of a progressive wavelet coder (PWC) technique. PWC image coding is discussed in the paper entitled "Fast Progressive Wavelet Coding" by H. S. Malvar in *Proc. IEEE Data Compression Conf*, April 1999, pp. 336–343. PWC image coding achieves a high-degree of compression by using "ping-pong" wavelet coefficient reordering to cluster coefficients quantized to zero.

Figure 11:
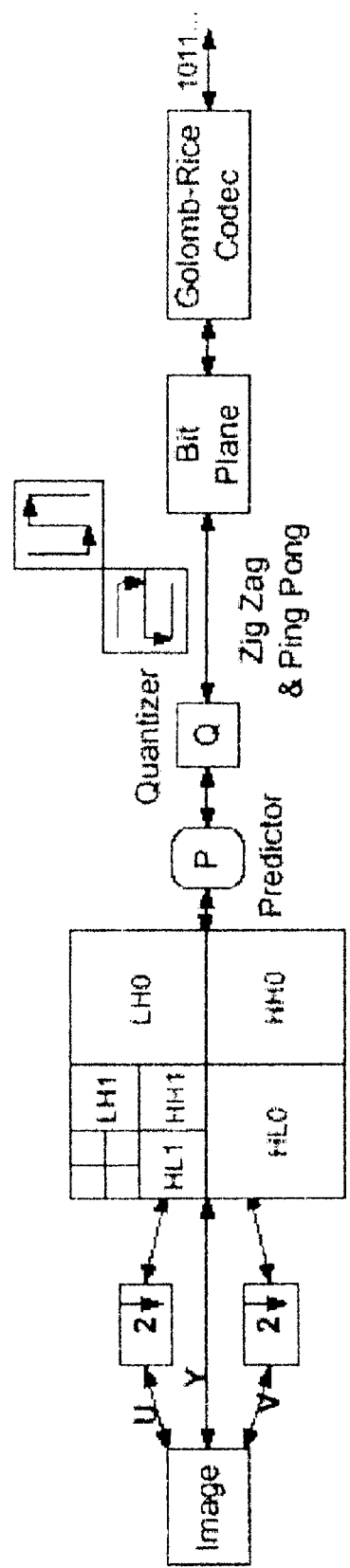
FIG. 11 is a block diagram illustrating a working example of the prediction module of the present invention implemented in a progressive wavelet coder (PWC) codec.

FIG. 11 is a block diagram illustrating a working example of the prediction module of the present invention implemented in a progressive wavelet coder (PWC) codec. An image to be compressed is decomposed into a subband decomposition. The prediction module P of the present invention is located before the quantizer Q and generates predicted wavelet coefficients. In accordance with the PWC technique, wavelet coefficient reordering is performed and the quantized values are coded using a Golomb-Rice encoder. The output from the PWC encoder is a bitstream (shown as binary number "1011") that represents the compressed version of the original image.

Referring to FIGS. 6 and 11, the prediction module P includes a store 600 that contains contexts (such as reconstructed transform coefficients) that are used to predict the $i^{th}$ coefficient. Ideally, these contexts should be as small as possible to minimize complexity. Nevertheless, the context should include enough coefficients in order to exploit statistical dependencies.

Figure 12:
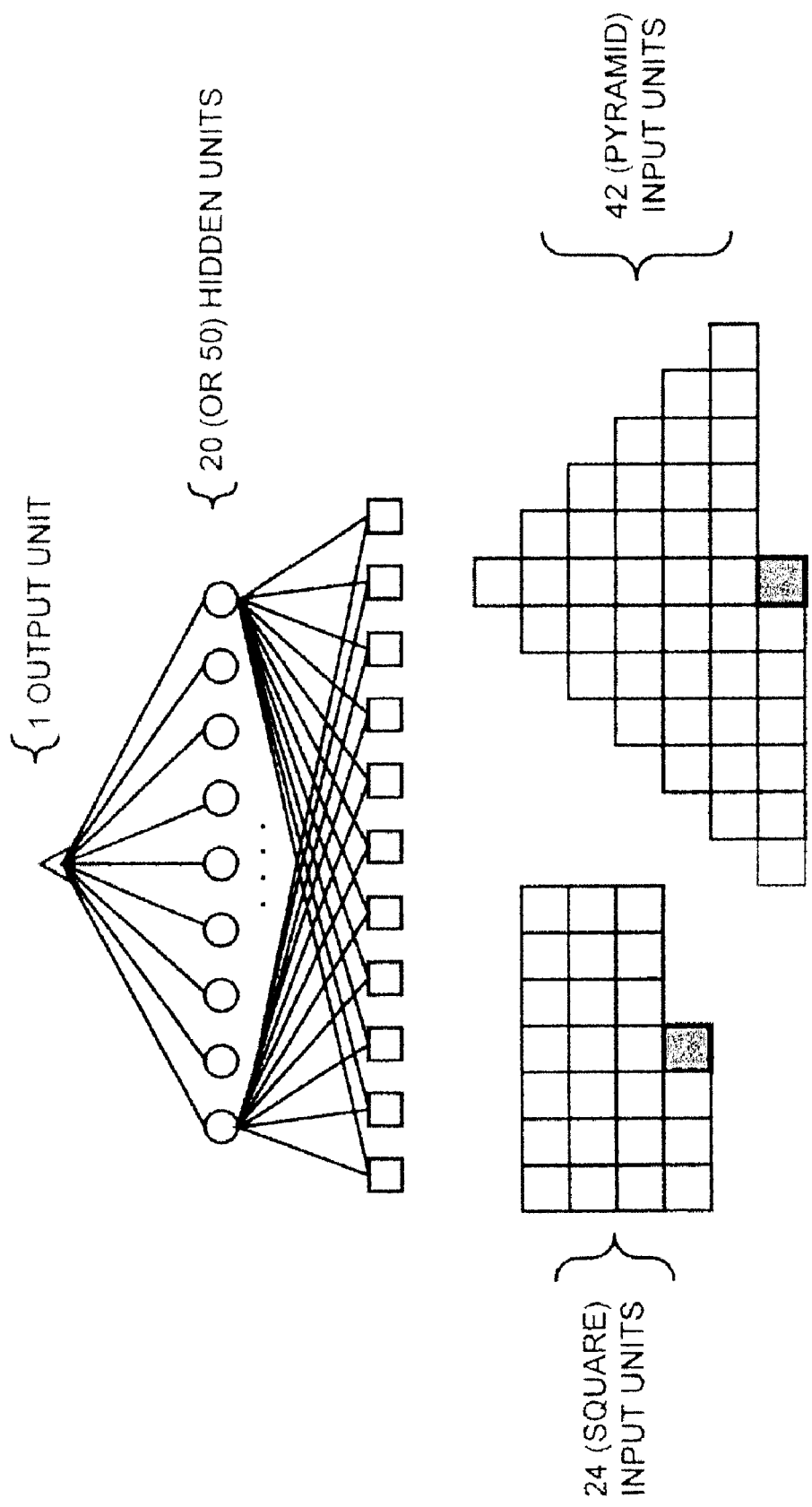
FIG. 12 illustrates the fully connected neural network architecture used in the working example.

In this working example a fully connected neural network structure was used. FIG. 12 illustrates the fully connected neural network architecture of this working example. The number of inputs is equal to the context size and several different numbers of hidden nodes were investigated. As shown in FIG. 12, two kinds of causal context were examined, namely, a box-shaped causal context and a pyramidal-shaped causal context. The idea behind the pyramidal context is that if the influence of some wavelet coefficient on the value to be predicted depends mainly on the Euclidean distance between the two (in the corresponding subband and wavelet level), then a radial context should be used.

Speedup Techniques

The present invention includes several speedup techniques that may be used to improve the speed at which compression and decompression occurs. Speed improvement is important, especially in real-time applications. To illustrate, assume that a quantization threshold of Q=10 is used. This gives a peak signal to noise ratio (PSNR) such that any distortion is hard to discern visually (usually between 36 and 40). For a neural network nonlinear predictor having N hidden nodes, with the 24-coefficient causal context input, the number of multiply-add operations required for a single evaluation is 25N. Thus, for a 20-hidden node network the number of multiply-adds (per image pixel) required to incorporate the prediction is approximately 470 (not 500, since the prediction is not used on all wavelet levels).

The speedup techniques of the present invention, however, may be used to significantly improve the speed. The first two speed techniques are called "context test" techniques. In general, a context test decides whether or not to apply the neural network, based on the reconstructed coefficient values used by the network as inputs. If the decision is that the predictor is not called, then the prediction is simply set to zero. A first context test speedup technique determines whether all the inputs to the nonlinear predictor are zero. If so, then a prediction of zero is made.

A second context test speedup technique tests neighboring reconstructed transform coefficients around the transform coefficient being predicted. If some specifically chosen reconstructed transform coefficients would be zero after quantization, then the predictor is not called and the transform coefficient is predicted to be zero. For the box causal context used in this working example, it was found that testing two coefficients gave the best overall results. More specifically, the best overall results were obtained when using a transform coefficient immediately to the left of the transform coefficient to be predicted and the transform coefficient immediately above the transform coefficient to be predicted. It should be noted that testing four transform coefficients gave slightly improved compression but not as marked a speedup as the two-coefficient test.

A third speedup technique is a sparse forward propagation technique that takes advantage of the sparseness of the input data to the predictor. If the causal context has passed the above test, this technique only forward propagates those values in the neural network's inputs that would not quantize to zero. For all other values the appropriate fixed values are used for their respective hidden nodes in the computation of the network's output. Because most of the transform coefficients quantize to zero, this gives a significant additional computational savings. In this working example, by combining the two-coefficient context test and the sparse forward propagation technique, the mean number of operations required per image pixel, in order to run the nonlinear prediction, was reduced by approximately a factor of ten.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A computer-implemented method for encoding data, comprising:
   transforming the data to obtain original transform coefficients;
   generating predicted transform coefficients using a nonlinear predictor; and
   encoding residuals using the original transform coefficients and the predicted transform coefficients.

2. The method as set forth in claim 1, wherein the nonlinear predictor is a trainable nonlinear predictor.

3. The method as set forth in claim 1, wherein the original transform coefficients are original wavelets coefficients and the predicted transform coefficients are predicted wavelet coefficients.

4. The method as set forth in claim 1, wherein the data is image data.

5. The method as set forth in claim 1, further comprising quantizing the residuals to obtain quantized residuals and encoding the quantized residuals.

6. The method as set forth in claim 1, further comprising storing reconstructed transform coefficients, wherein the stored reconstructed transform coefficients are used by the nonlinear predictor to generate future predicted transform coefficients.

7. The method as set forth in claim 6, wherein the reconstructed transform coefficients are obtained by associating the predicted transform coefficients with unquantized residuals.

8. The method as set forth in claim 7, wherein the unquantized residuals are obtained by quantizing the residuals to produce quantized residuals and then unquantizing the quantized residuals.

9. The method as set forth in claim 1, wherein the residuals are obtained by subtracting the predicted transform coefficients from the original transform coefficients.

10. The method as set forth in claim 2, wherein the trainable nonlinear predictor is a neural network.

11. The method as set forth in claim 2, further comprising training the trainable nonlinear predictor using offline training.

12. The method as set forth in claim 2, further comprising training the trainable nonlinear predictor using online training.

13. The method as set forth in claim 12, wherein the online training comprises using reconstructed transform coefficients obtained from the predicted transform coefficients as training data, and wherein training occurs on compressed images.

14. The method as set forth in claim 2, further comprising training the trainable nonlinear predictor using in-loop training.

15. The method as set forth in claim 14, wherein in-loop training comprises:
   providing a fixed set of training data to the trainable nonlinear predictor; and
   dynamically augmenting the fixed set of training data with reconstructed transform coefficients obtained from the predicted transform coefficients.

16. The method as set forth in claim 1, further comprising:
   determining whether the original transform coefficients would quantize to approximately zero.

17. The method as set forth in claim 16, further comprising skipping the generation of predicted transform coefficients by the nonlinear predictor if all of the reconstructed transform coefficients used as inputs to the nonlinear predictor would quantize to zero.

18. The method as set forth in claim 1, further comprising:

selecting an original transform coefficient to be predicted from the original transform coefficients; and determining whether neighboring reconstructed transform coefficients in the causal context around the original transform coefficient to be predicted would quantize to zero.

19. The method as set forth in claim 18, further comprising omitting the generation of predicted transform coefficients by the nonlinear predictor if all of the neighboring reconstructed transform coefficients would quantize to zero.

20. The method as set forth in claim 18, further comprising omitting the generation of predicted transform coefficients by the nonlinear predictor if a specifically chosen subset of the neighboring reconstructed transform coefficients would quantize to zero.

21. A computer-readable medium having computer-executable instructions for encoding data, comprising:

transforming the data to obtain original transform coefficients;

generating predicted transform coefficients using a nonlinear predictor; and encoding residuals using the original transform coefficients and the predicted transform coefficients.

22. A computer-implemented method for decoding data, comprising:

receiving residuals of the data;

generating predicted transform coefficients using a nonlinear predictor;

generating reconstructed transform coefficients using the predicted transform coefficients and the residuals; and using the reconstructed transform coefficients to reconstruct the data.

23. The method as set forth in claim 22, wherein the reconstructed transform coefficients are used by the nonlinear predictor to generate future predicted transform coefficients.

24. The method as set forth in claim 22, wherein the nonlinear predictor may be trained.

25. The method as set forth in claim 24, further comprising training the nonlinear predictor using at least one of: (a) offline training; (b) online training; (c) in-loop training.

26. A computer-readable medium having computer-executable instructions for decoding data, comprising:

receiving residuals of the data;

generating predicted transform coefficients using a nonlinear predictor;

generating reconstructed transform coefficients using the predicted transform coefficients and the residuals; and using the reconstructed transform coefficients to reconstruct the data.

27. A nonlinear prediction encoder for encoding data, comprising:

a transformation module that performs a transformation on the data to produce original transform coefficients;

a nonlinear predictor that produces predicted transform coefficients;

a prediction module that generates residuals from the original transform coefficients and the predicted transform coefficients; and an entropy coder that encodes the residuals to produce an encoded representation of the data.

28. The nonlinear prediction encoder as set forth in claim 27, wherein the nonlinear predictor is a neural network.

29. The nonlinear prediction encoder as set forth in claim 27, wherein the prediction module further comprises an inverse quantizer that receives quantized residuals and outputs unquantized residuals.

30. The nonlinear prediction encoder as set forth in claim 27, wherein the prediction module further comprises a store containing reconstructed transform coefficients that are used by the nonlinear predictor.

31. The nonlinear prediction encoder as set forth in claim 30, wherein the reconstructed transform coefficients are obtained by associating the predicted transform coefficients and the unquantized residuals.

32. A nonlinear prediction decoder for decoding data, comprising:

an entropy decoder that decodes an encoded bitstream to produce quantized residuals;

an inverse quantizer that unquantizes the quantized residuals to produce unquantized residuals;

a nonlinear predictor that generates predicted transform coefficients; and an inverse prediction module that uses the predicted transform coefficients and the unquantized residuals to obtain reconstructed transform coefficients that are used to reconstruct the data.

33. A nonlinear prediction data compression system, comprising:

a nonlinear predictor for generating predicted transform coefficients;

a nonlinear prediction encoder that uses the predicted transform coefficients to encode original data to produce an encoded bitstream; and a nonlinear prediction decoder that uses the predicted transform coefficients to decode the encoded bitstream and reconstruct the original data.

34. A nonlinear prediction encoder for encoding image data, comprising:

a transformation module that generates original transform coefficients from the image data;

a nonlinear predictor that generates nonlinear predictions of the original transform coefficients and produces residuals using the nonlinear predictions and the original transform coefficients; and an entropy coder that encodes the residuals;

wherein the nonlinear predictions reduce the entropy of the residuals that the entropy coder must encode.

* * * * *

UNITED STATES PATENT AND TRADEMARK OFFICE
CERTIFICATE OF CORRECTION

PATENT NO. : 6,704,718 B2
DATED : March 9, 2004
INVENTOR(S) : Burges et al.

It is certified that error appears in the above-identified patent and that said Letters Patent is hereby corrected as shown below:

Column 8,
Line 38, "$R_j$" should be changed to -- $R_i$ --

Column 9,
Line 25, insert -- $P_i$ -- after "coefficients"

Line 26, insert -- $\widetilde{R}_i$ -- after "residuals"

Line 27, insert -- $\widetilde{C}_i$ -- after the first "coefficients"

Column 11,
Line 4, equation should appear as follows:

$$W^{t+1} = W^t - \varepsilon \frac{\partial E_i(W)}{\partial W} \qquad (3)$$

Signed and Sealed this

Fourteenth Day of September, 2004

JON W. DUDAS
*Director of the United States Patent and Trademark Office*